US007895379B2

(12) United States Patent
Weber et al.

(10) Patent No.: US 7,895,379 B2
(45) Date of Patent: Feb. 22, 2011

(54) LOGIC CONTROLLER HAVING HARD-CODED CONTROL LOGIC AND PROGRAMMABLE OVERRIDE CONTROL STORE ENTRIES

(75) Inventors: Ross M. Weber, Elk River, MN (US); David R. Spatafore, Blaine, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 12/342,213

(22) Filed: Dec. 23, 2008

(65) Prior Publication Data

US 2010/0161866 A1 Jun. 24, 2010

(51) Int. Cl.
G06F 13/00 (2006.01)
G06F 7/38 (2006.01)
(52) U.S. Cl. .............................. 710/105; 712/4; 712/6; 712/7
(58) Field of Classification Search ................. 710/100, 710/105–107, 306; 712/4, 6, 7
See application file for complete search history.

(56) References Cited

U.S. PATENT DOCUMENTS

| | | | | |
|---|---|---|---|---|
| 3,827,031 A | * | 7/1974 | Kastner et al. ................. | 712/7 |
| 5,553,309 A | * | 9/1996 | Asai et al. ...................... | 710/34 |
| 5,996,057 A | * | 11/1999 | Scales et al. ................... | 712/5 |
| 7,100,026 B2 | * | 8/2006 | Dally et al. ................. | 712/222 |
| 2008/0263418 A1 | * | 10/2008 | Ward .......................... | 714/724 |

* cited by examiner

*Primary Examiner*—Glenn A Auve
(74) *Attorney, Agent, or Firm*—Charles A. Johnson

(57) ABSTRACT

Control logic of a node controller receives an input vector and produces an output vector. The control logic includes a plurality of tied control store entries including hard-coded logic to identify unique values of the input vector and to produce the output vector from a hard-coded output vector when the input vector is identified and when the tied control store is enabled. The control logic also includes a plurality of spare control store entries including programmable logic configurable to identify values of the input vector and to produce the output vector from a programmable output vector when the input vector is identified and when the spare control store is enabled. One of the spare control store entries that is configured to identify a value of the input vector that none of the tied control store entries that are enabled by the entry-enables register are configured to identify is enabled.

20 Claims, 5 Drawing Sheets

LOGIC CONTROLLER HAVING HARD-CODED CONTROL LOGIC AND PROGRAMMABLE OVERRIDE CONTROL STORE ENTRIES

TECHNICAL FIELD

This application relates to logic controllers for multi-processor computing systems.

BACKGROUND

A processor, such as a central processing unit (CPU), is generally a piece of hardware that controls various elements of a computing device. A processor generally cycles through four stages: instruction fetch, decode, execute, and writeback. That is, the processor initially retrieves an instruction, interprets the instruction, performs the instruction as interpreted, and then performs a transaction, e.g., providing output to or retrieving data from memory or a device. In general, a transaction performed by a processor is any process or bus operation performed by the processor and typically constitutes a set of control and data signals produced by the processor and applied to the bus. A chip including control logic may act as an interface between two buses of a system, e.g., a processor bus and a memory bus. In general, the control logic receives an input vector from a source bus and produces an output vector on a destination bus.

In certain cases, actions of the control logic interfacing between the two system buses need to be modified with respect to their state or timing. For example, there may have been an upgrade to a processor, a bus architecture, a memory interface, and the like. As another example, the control logic may produce incorrect output, requiring a bug fix. Certain components may require input that differs from that produced by a component connected to the source bus, e.g., a processor, a memory, an I/O device, or other component. In some cases, modifying input vectors may improve performance.

Originally, even to make a slight change to signals produced by the control logic for a distinct input vector, such as a transaction (e.g., a memory read), a chip storing the control logic would need to be discarded, redesigned, and remanufactured. However, some conventional computing systems now utilize programmable control logic. The programmable control logic receives an input vector of signals, which may include a transaction from the processor, and selects one of a plurality of a large bank of memory to produce an output vector of signals. For this reason, programmable control logic includes a large set of memories, such as registers, register arrays, or random access memories (RAMs), with which to store specific output signals for each of the different possible combinations of input signals from the processor. These programmable memories are present on a die of the chip that includes the control logic and consume valuable space on the die, making the chip considerably more expensive in terms of cost and die space and also reduce the processing efficiency (i.e., speed) of the control logic.

SUMMARY

In general, techniques are described for implementing control logic that is smaller, less expensive, and more efficient than conventional control logic. For example, a node controller for a complex multi-processor system is described that includes programmable control logic yet uses fewer internal registers or other memories than conventional programmable control logic of a controller. The node controller according to the techniques described herein does not require an internal bank of random access memory (RAM). Instead, the control logic of the node controller primarily utilizes hard-coded control logic but includes a select number of programmable control store entries that can configured to override or extent the otherwise hard-coded control logic for any given vector of input signals from a processor. Therefore, the node controller can be smaller and more efficient than conventional, fully-programmable controllers.

In one configuration, the control logic of the node controller includes a set of hard-coded control store entries (referred to herein as tied control store entries) and a set of spare control store entries. Each of the tied control store entries utilize internal hard-coded control logic (i.e., fixed logic gates within the chip die) to produce fixed output signals for a specific value of the input signals received from the processor (i.e., the input vector). However, the spare control store entries included within the control logic provide programmable registers for identifying values for the input signals and for producing particular output vectors thereof. The control logic can be configured such that any of the spare control store entries may be used to override any of the tied control store entries or to accept a new input vector that none of the tied control store entries currently accept. In this way, the die space of the node controller may be conserved in that there may be far fewer spare control store entries than tied control store entries, e.g., by an order of magnitude. The control logic, in one embodiment, may also include a set of input and output registers that globally modify the input vector produced by the processor before application to the control store entries and globally modify any output vector produced by the control store entries, respectively, thus further reducing the number of spare control store entries needed.

In one embodiment, a system includes a source bus, a component connected to the source bus, wherein the component produces a first set of electrical signals, a node controller, connected to the source bus, comprising control logic that receives the first set of electrical signals from the source bus as an input vector and produces an output vector comprising a second set of electrical signals, wherein the control logic comprises, an entry-enables register that selectively enables and disables a plurality of control store entries that include a plurality of tied control store entries, wherein the tied control store entries each includes hard-coded logic configured to identify unique values of the input vector from the source bus and produces the second set of electrical signals from a hard-coded output vector when the input vector is identified and when the tied control store is enabled, and a plurality of spare control store entries, wherein the spare control store entries each includes programmable logic configurable to identify values of the input vector and produces the second set of electrical signals from a programmable output vector when the input vector is identified and when the spare control store is enabled, wherein at least one of the spare control store entries is configured to identify a value of the input vector for which none of the tied control store entries that are enabled by the entry-enables register are configured to identify, wherein the entry-enables register enables the at least one of the spare control store entries, and a destination bus that receives the output vector from the node controller, wherein the node controller is connected to the bus.

In another embodiment, a method includes receiving an input vector comprising a first set of electrical signals from a component of a source bus of a computing device, identifying values of the input vector with at least one of a plurality of control store entries, wherein the plurality of control store entries includes a first subset comprising tied control store entries that each include hard-coded logic and hard-coded output vectors, and wherein the plurality of control store entries includes a second subset comprising spare control store entries that each include programmable logic and a programmable output vector, receiving a signal that selectively enables and disables each of the tied control store entries and each of the spare control store entries, wherein the signal enables at least one of the spare control store entries that is configured to identify a value of the input vector for which none of the tied control store entries that are enabled by the signal are configured to identify, and outputting the programmable output vector of the at least one of the spare control store entries to a destination bus of the computing device.

In another embodiment, a device includes means for receiving an input vector comprising a first set of electrical signals from a component of a source bus of a computing device, means for identifying values of the input vector with at least one of a plurality of control store entries, wherein the plurality of control store entries includes a first subset comprising tied control store entries that each include hard-coded logic and hard-coded output vectors, and wherein the plurality of control store entries includes a second subset comprising spare control store entries that each include programmable logic and a programmable output vector, means for receiving a signal that selectively enables and disables each of the tied control store entries and each of the spare control store entries, wherein the signal enables at least one of the spare control store entries that is configured to identify a value of the input vector for which none of the tied control store entries that are enabled by the signal are configured to identify, and means for outputting the programmable output vector of the at least one of the spare control store entries to a destination bus of the computing device.

The techniques described herein may provide several advantages. For example, a node controller implemented in accordance with these techniques may require less die area than conventional control logic because the node controller uses far fewer registers than conventional control logic. The node controller may therefore require less power, perform more efficiently, generate less heat, execute more quickly, take up less room, and other advantages associated with a smaller-sized chip.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
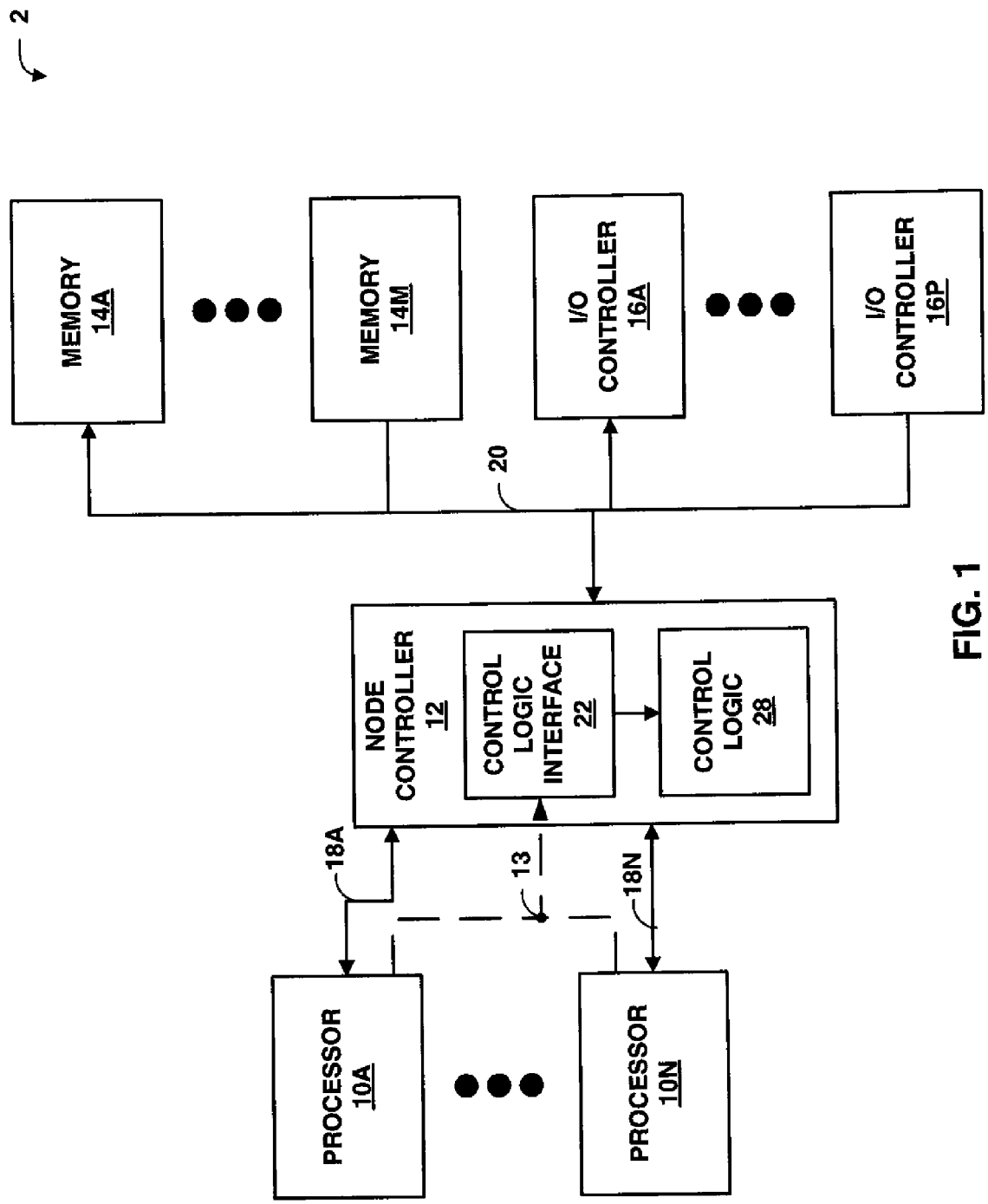
FIG. 1 is a block diagram illustrating an example computing system in which control logic of a node controller modifies the electrical signals produced by a plurality of processors.

FIG. 1 is a block diagram illustrating example computing system 2 in which control logic 28 of node controller 12 modifies an input vector, which may include a transaction, from processors 10A-10N (processors 10). In general, an input vector may be any electrical signals received by control logic 28 from a source bus, e.g., one of source buses 18A-18N (source buses 18). Control logic 28 of node controller 12 generally acts as an interface between two system buses, e.g., a source bus and a destination bus. The source bus may be, for example, a processor bus connected to one or more processors, a memory bus, an input/output (I/O) bus, or other internal or external bus. The destination bus, e.g., bus 20, may be, for example, a memory bus, an I/O bus, a bus connected to the input of node controller 12, a bus connected to another node controller that includes control logic, or other internal or external bus. Input vectors may also include output provided by state machines internal to node controller 12, data from internal registers of node controller 12, or other components of node controller 12 that are generally used for providing an interface between processors 10 and other components of computing system 2. The components of FIG. 1 are generally situated within a computing device (not shown). Processors 10, for example, generate sets of electrical signals that may constitute transactions, e.g., bus operations to interact with memories 14A-14M (memories 14) or I/O controllers 16A-16P (I/O controllers 16). For example, the electrical signals may constitute transactions for performing fetches from one or more of memories 14, writes to one or more of memories 14, fetches from one or more of I/O controllers 16, or writes to one or more of I/O controllers 16.

As shown in FIG. 1, node controller 12 sits between processors 10 and memories 14 and I/O controllers 16. Control logic 28 of node controller 12 receives input vectors from a source bus, e.g., one of source buses 18 connected to processors 10, and generates output vectors of electrical signals, which may include output transactions, delivered to memories 14 and I/O controllers 16 via destination bus 20, in accordance with the techniques described herein. Output vectors may also include updates to state registers maintained by control logic 28 of node controller 12. In many cases, node controller 12 produces the electrical signals of the output vector as a modified form of the electrical signals of the input vector, such as by altering the state of one or more of the digital signals. In other configurations, one or more of processors 10 and node controller 12 may interact with other components of a computing device in addition to memories 14 and I/O controllers 16. Node controller 12 may also receive input vectors or input transactions from other components of system 2, e.g., via a memory bus, an I/O bus, or other internal or external bus.

Control logic 28 of node controller 12 includes control store entries that modify an input vector to generate an output vector. The control store entries include a set of tied control store entries, as well as a set of programmable, spare control store entries. The tied control store entries each include digital logic gates to identify a particular set of input signals as an input vector and, upon detecting a match, produce a particular set of electrical signals as an output vector. The spare control store entries each include programmable registers for identifying an input vector and for producing an output vector. Node controller 12 provides an interface for selectively enabling and disabling the control store entries, i.e., the individual ones of the tied control store entries and the spare control store entries, thus allowing selection between hard-coded digital logic gates of the tied control store entries and the programmable registers of the spare control store entries for any individual set of electrical signals of the input vector.

Node controller interface 22 writes data to the registers of node controller 12 to program one or more of the spare control store entries. For example, in response to input configuration data 13 provided by a user and received configuration software executing on processors 10, node controller interface 22 overrides one of the tied control store entries by writing a comparison input vector to a register of a spare control store entry, where the comparison input vector matches the hard-coded logic of the tied control store to be overridden. Node controller interface 22 also writes an updated output vector to a register of the spare control store being utilized. Node controller 12 also enables that spare control store and disables the one of the tied control store entries.

In this manner, one of the spare control store entries 40 can be configured to override the output of any one of the tied control store entries as necessary. As another example, node controller interface 22 may write a new comparison input vector to a register of a spare control store entry, where the comparison input vector does was not originally identified by any of the tied control store entries. In this manner, a spare control store may recognize a new input vector that is not recognized by any of the tied control store entries. Thus, node controller 12 can be configured such that any of the spare control store entries may be used to override any of the tied control store entries or to accept a new input vector that none of the tied control store entries currently accept. In this way, the die space of node controller 12, which is typically an application specific integrated circuit (ASIC) may be conserved in that there may be far fewer spare control store entries than tied control store entries, e.g., by an order of magnitude.

Node controller 12 may also be configured to globally modify an input vector before the input vector is applied to any of the tied control store entries. Similarly, node controller 12 may be configured to globally modify the output vector produced by any of the tied control store entries for a given transaction. In this way, large scale modification can be made to control logic without requiring use of any of the programmable spare control store entries, thus further reducing the number of programmable registers that may be needed within node controller 12 so as to provide programmable flexibility to overcome any design errors or modifications.

Node controller 12 as described herein may provide several advantages. For example, node controller 12 may require less die area than a chip that includes conventional, fully-programmable control logic because control logic 28 of node controller 12 may use far fewer programmable registers than conventional control logic. Node controller 12 may therefore require less power, perform more efficiently, generate less heat, execute more quickly, take up less room, and other advantages associated with a smaller-sized chip. In one embodiment, node controller 12 may be a chip that connects to a motherboard. In another embodiment, control logic 28 may occupy a portion of one of processors 10.

Figure 2:
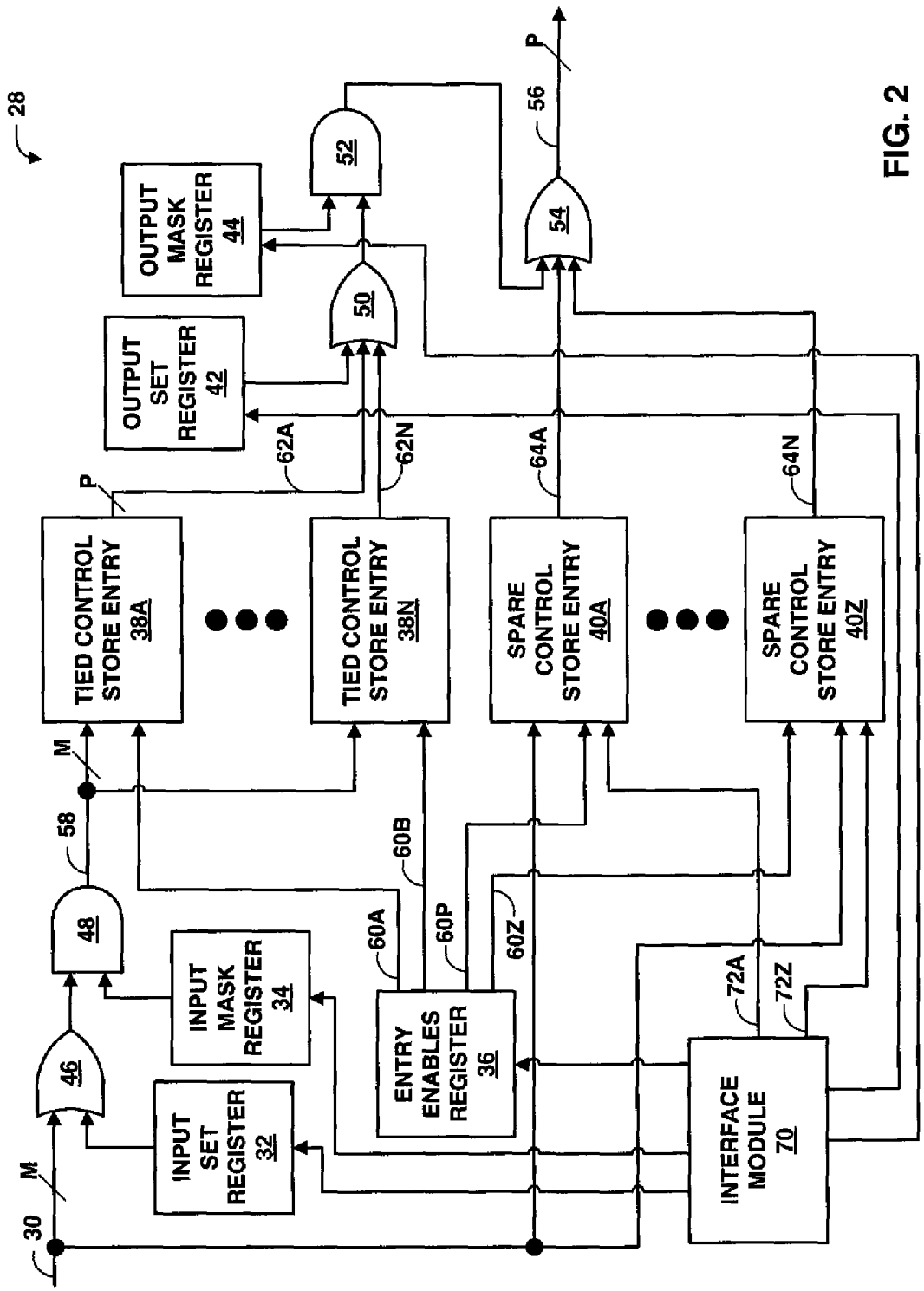
FIG. 2 is a block diagram illustrating an example embodiment of control logic of a node controller.

FIG. 2 is a block diagram illustrating an example embodiment of control logic 28 of node controller 12 in greater detail. In the example embodiment of FIG. 2, control logic 28 includes a set of tied control store entries 38A-38N (tied control store entries 38) and a set of spare control store entries 40A-40N (spare control store entries 40). In general, tied control store entries 38 receive an input vector and produce an output vector according to hard-coded logic, and spare control store entries 40 receive an input vector and produce an output vector according to programmable logic. Entry-enables register 36 selectively enables one or more of spare control store entries 40 to recognize an input vector that is distinct from each of the input vectors recognized by tied control store entries 38.

For example, one of spare control store entries 40 may be programmed to recognize the same input vector as a particular one of tied control store entries 38, but also to produce an output that is distinct from the hard-coded output produced by the one of tied control store entries 38. Entry-enables register 36 may then enable the one of spare control store entries 40 and disable the one of tied control store entries 38. In this manner, one of spare control store entries 40 may override one of tied control store entries 38. As another example, one of spare control store entries 40 may be programmed to recognize an input vector that none of tied control store entries 38 recognizes. Entry-enables register 36 may then enable the one of spare control store entries 40 to provide an output vector in response to the input vector. In this manner, the one of spare control store entries 40 may provide an output vector in response to an input vector that none of tied control store entries 38 recognizes. In one embodiment, control logic 28 has far fewer spare control store entries 40 than tied control store entries 38, e.g., by an order of magnitude. For example, in the example of FIG. 2, control logic 28 receives input vector 30 from one of processors 10, which is a bit sequence of length M. Rather than utilizing a large RAM or set of registers to cover all or much of the $2^M$ possible combinations of input signals, a designer may elect to lay out control logic 28 with an order of magnitude less programmable registers so as to reduce die space yet provide sufficient programmable flexibility to address any errors or modifications that may arise with respect to any of the $2^M$ combinations of input signals.

Input vector 30 generally reflects a transaction sent to or received from a bus and other internal state of control logic 28. In the example of FIG. 2, control logic 28 includes input set register 32 and input mask register 34, which may be configured by node controller interface 22 to, for example, either set (i.e., make equal to logic value "1") and/or mask (i.e., make equal to logic value "0") one or more particular bits of input vector 30 before the corresponding signals are applied to tied control store entries 38 and spare control store entries 40.

Input set register 32 is combined with input vector 30 using a bitwise OR of OR gate 46. Therefore, the default value of all bits of input set register 32 is "0." To set a particular bit of input vector 30 to "1", the corresponding bit of input set register 32 is set to "1." Therefore, when OR gate 46 compares the bits of input vector 30 with input set register 32, the resulting value will be "1" when the particular bit is set in input set register 32, otherwise the value will be the value from input vector 30. In this manner, a bit of input vector 30 may be globally set to a digital logic value of "1" using input set register 32. The bit is set globally in that the bit will be set to a digital logic value of "1" regardless of the value of the corresponding bit of input vector 30.

Input mask register 34 is combined with the output of OR gate 46 using AND gate 48. Therefore, the default value of all bits of input mask register is "1." To mask a particular bit of input vector 30 to "0," the corresponding bit of input mask register 34 is set to "0." Therefore, when AND gate 48 compares the bits of the output of OR gate 46 with input mask register 34, the resulting value will be "0" when the particular bit is "0" in input mask register 34, otherwise the value will be the value from the output of OR gate 46. In this manner, a bit of input vector 30, after having been processed by OR gate 46, may be globally set to a digital logic value of "0" using input mask register 34. The bit is set globally in that the bit will be set to a digital logic value of "0" regardless of the value of the corresponding bit of input vector 30. In other embodiments, tied control store entries 38 may directly receive input vector 30 without control logic 28 first globally processing input vector 30. Likewise, in other embodiments, tied control store entries 38 may provide outputs 62 directly to OR gate 54 without control logic 28 first globally processing outputs 62.

The output of AND gate 48 is passed to each of tied control store entries 38 as input vector 58. Outputs 62A-62N of tied control store entries 38, in the example of FIG. 2, are also globally modified by output set register 42 and output mask register 44 by combining the output of tied control store entries 38 with output set register 42 using OR gate 50 and by combining the output of OR gate 50 with output mask register 44 using AND gate 52. In this manner, the output of control store entries 38 may also be globally set to either a digital logic value of "0" or "1." Outputs 62A-62N are each P-bit vectors. It should be noted that the value of P may be different than the value of M. That is, outputs 62A-62N may include a different number of bits than input vector 30.

Interface module 70 receives commands from node controller interface 22 (FIG. 1) to set particular values in input set register 32, input mask register 34, output set register 42, and output mask register 44. Accordingly, interface module 70 establishes the proper bits of these registers to enforce a global change to input vector 30 or to an output vector from output of tied control store entries 38. Interface module 70 also receives commands from node controller interface 22 to program spare control store entries 40, as described in greater detail with respect to FIG. 4. Moreover, interface module 70 receives commands from node controller interface 22 to program entry-enables register 36.

Entry-enables register 36 selectively enables and disables particular ones of tied control store entries 38 and spare control store entries 40. Entry-enables register 36 includes one bit for each of tied control store entries 38 and spare control store entries 40. Each bit is tied to a particular one of either tied control store entries 38 or spare control store entries 40 by a link. For example, a bit of entry-enables register 36 corresponding to tied control store entry 38A is coupled to tied control store entry 38A by link 60A. Similarly, bits corresponding to tied control store entry 38N, spare control store entry 40A, and spare control store entry 40Z are tied thereto by links 60N, 60P, and 60Z, respectively.

When one of spare control store entries 40 is programmed to override one of tied control store entries 38, entry-enables register 36 enables the one of spare control store entries 38 and disables the one of tied control store entries 38. For example, spare control store entry 40A may be programmed to override tied control store entry 38A. To do so, interface module 70 sets an input register of spare control store entry 40A to the same value as a hard-coded input value, and programs entry-enables register 36 to enable spare control store entry 40A and to disable tied control store entry 40A. Therefore, entry-enables register 36 will provide an enabling signal to spare control store entry 40A via link 60P and a disabling signal to tied control store entry 38A via link 60A. As another example, spare control store entry 40A may be programmed to recognize an input vector that is distinct from each of the input vectors recognized by tied control store entries 38. Therefore, entry-enables register 36 enables spare control store entry 40A to provide an output vector in response to the input vector recognized by spare control store entry 40A.

The results of AND gate 52 and outputs 64A-64N of spare control store entries 40 are combined by OR gate 56 to form output vector 56. Outputs 64A-64N and output vector 56 are also P-bit vectors. In accordance with the techniques described herein, output vector 56 should match exactly one of the output vectors provided by either one of tied control store entries 38 (as globally modified by output set register 42 and output mask register 44) or one of spare control store entries 40. In this manner, control logic 28 forms output vector 56. In one embodiment, output vector 56 corresponds to an output transaction for, e.g., a bus process. In some embodiments, output vectors from outputs 62 and outputs 64 may be ORed together by OR gate 54 to create an output vector 56 that does not necessarily match any of outputs 62 and outputs 64.

Figure 3:
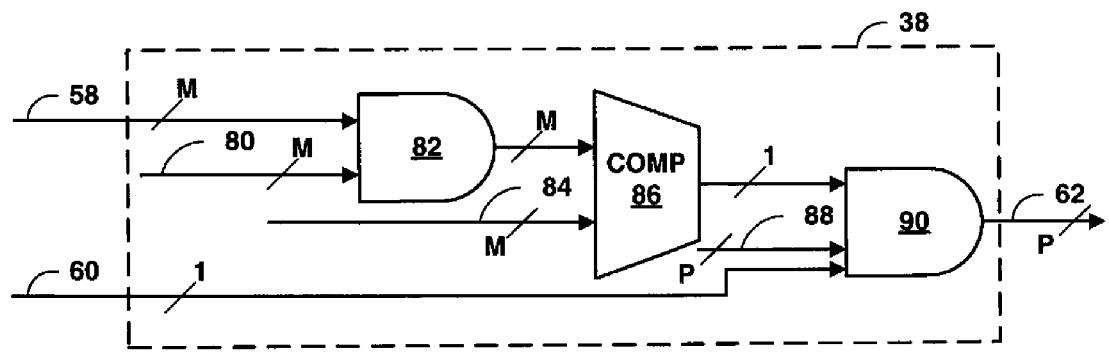
FIG. 3 is a block diagram illustrating an example embodiment of a tied control store entry.

FIG. 3 is a block diagram illustrating an example embodiment of one of tied control store entries 38. In general, each of tied control store entries 38 includes hard-coded logic (i.e., a set of specific digital logic gates) for identifying input vector 58 and sending output vector 62 when input vector 58 is identified and when enabled by entry-enables register 36 (FIG. 2). Entry-enables register 36 sends a single bit signal 60 of digital logic value "1" when the one of tied control store entries 38 is enabled and "0" when the one of tied control store entries 38 is disabled.

The example one of tied control store entries 38 of FIG. 3 includes hard-coded input mask vector 80 that is used to mask one or more bits of input vector 58. Input mask vector 80 is hard-coded in that each bit is tied either to a high "1" digital value or a low "0" digital value. Because the bits of input mask vector 80 are tied either high or low, input mask vector 80 takes up significantly less die area (i.e., chip area of node controller 12) than a register or RAM, for example. Input mask vector 80 is used to set particular bits of input vector 58 to digital logic value "0" by combining input vector 58 and input mask vector 80 using AND gate 82.

Comparison gate 86 compares the M-bit vector resulting from AND gate 82 to compare vector 84, which is also a hard-coded M-bit vector. Comparison gate 86 produces a single bit that is a digital logic value of "1" when the result of AND gate 82 is identical to compare vector 84 and a digital logic value of "0" otherwise.

Output vector 88 is a P-bit vector that is combined with the result of comparison gate 86 and signal 60 by AND gate 90. The single bit results of comparison gate 86 and signal 60 are applied by AND gate 90 to each bit of output vector 88. Therefore, when either compare vector 84 or signal 60 have a digital logic value of "0", meaning that the results of the comparison were negative or that the one of tied control store entries 38 is disabled, the output of the one of tied control store entries 38 will be a P-bit vector of all digital logic "0" values. Otherwise, when the one of tied control store entries 38 is enabled by signal 60 and when the masked input vector formed by AND gate 82 matches comparison vector 84, the one of tied control store entries 38 sends output vector 88 to OR gate 50 (FIG. 2).

Figure 4:
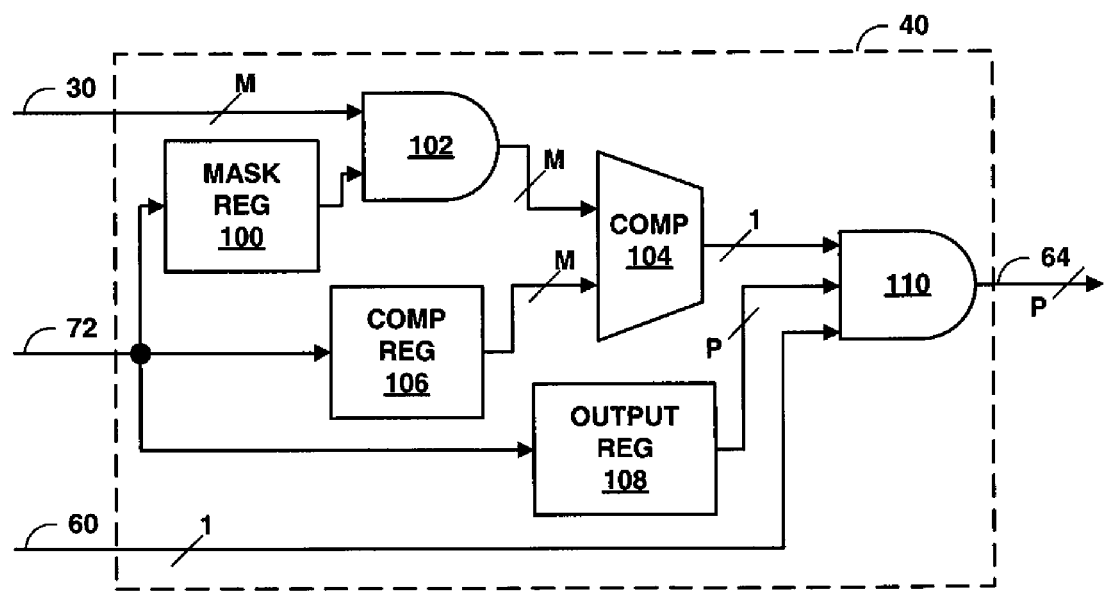
FIG. 4 is a block diagram illustrating an example embodiment of a spare control store entry.

FIG. 4 is a block diagram illustrating an example embodiment of one of spare control store entries 40. In general, each of spare control store entries 40 includes programmable registers for masking an input vector, identifying the masked input vector, and for providing an output vector when the masked input vector is identified and when enabled by entry-enables register 36 (FIG. 2). Entry-enables register 36 sends a single bit signal 60 of digital logic value "1" when the one of spare control store entries 40 is enabled and "0" when the one of spare control store entries 40 is disabled.

Input vector 30 is first masked by AND gate 102 using mask register 100. That is, each bit of input vector 30 is combined by a digital logic AND with a corresponding bit of mask register 100 by AND gate 102. Because mask register 100 is a register, mask register 100 is programmable. Interface module 70 programs mask register 100 by sending signal 72 to mask register 100 that sets a value for each bit of mask register 100. Interface module 70 sets bits of mask register 100 to a digital logic value of "1" by default and bits that are to be masked to a digital logic value of "0."

Interface module 70 also programs comparison register 106 to recognize a particular input vector. Interface module 70 sends signal 72 to comparison register 106 that sets a value for each bit of comparison register 106 that matches the input vector to be recognized. After input vector 30 is masked by AND gate 102, comparison gate 104 compares the result with comparison register 106 to determine whether the input vector matches comparison register 106. Comparison gate 104 produces a single bit that is a digital logic value of "1" when the result of AND gate 102 is identical to comparison register 106 and a digital logic value of "0" otherwise.

Interface module 70 also programs output register 108 to produce a particular output vector. Interface module 70 sends signal 72 to output register 108 that selects a value for each bit of output register 108 to produce a P-bit output vector. AND gate 110 applies a digital logic AND function to each bit of output register 108 with signal 60 from entry-enables register 36 and the results of comparison gate 104. Therefore, when comparison gate 104 and signal 60 each have a digital logic value of "1," AND gate 110 produces the output vector of output register 108, and an output vector of all "0" digital logic values otherwise. Output 64 of AND gate 110 is provided to OR gate 54 (FIG. 2).

Figure 5:
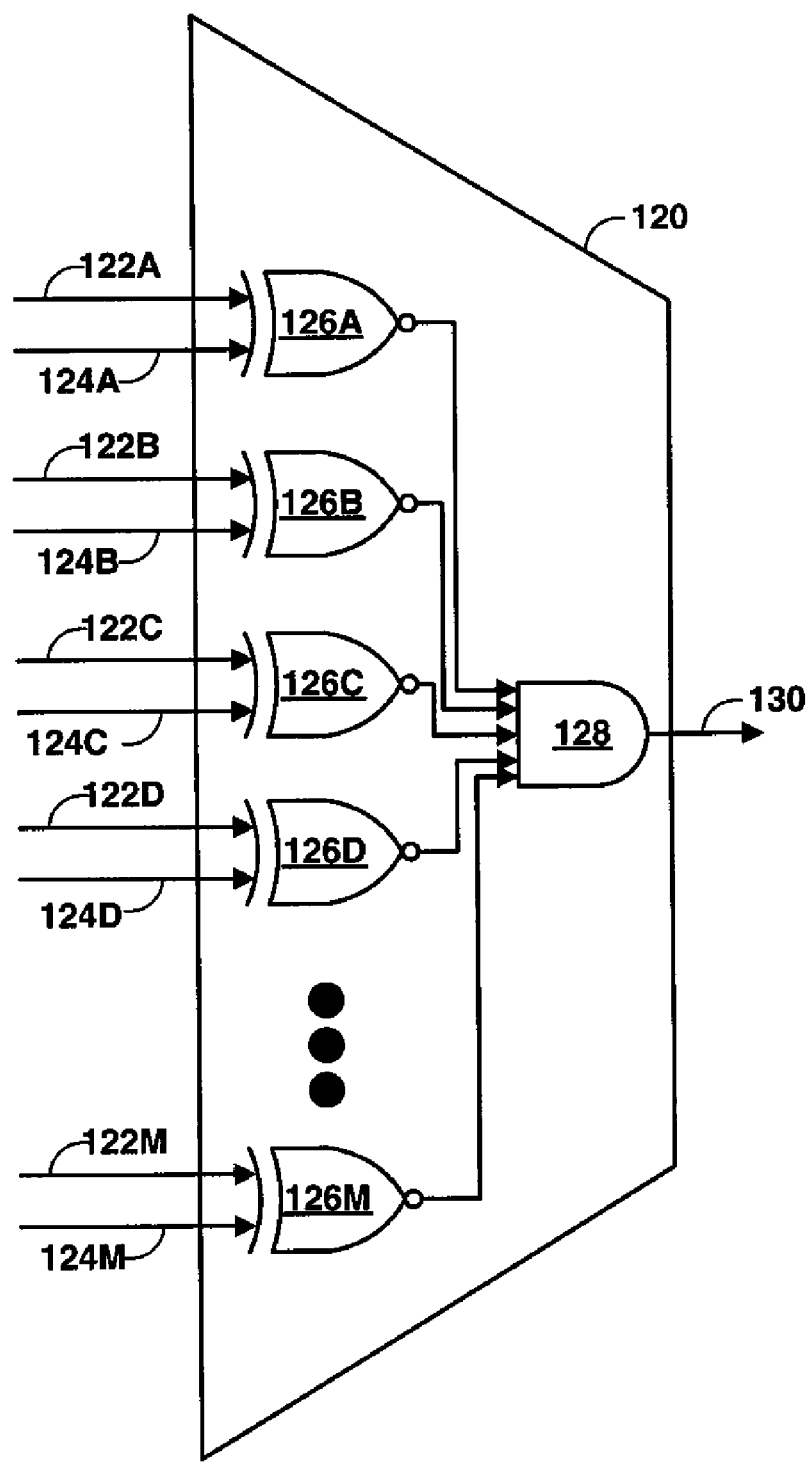
FIG. 5 is a block diagram illustrating an example embodiment of a comparison logic gate.

FIG. 5 is a block diagram illustrating an example embodiment of comparison gate 120. Comparison gate 120 may correspond to either or both of comparison gate 86 (FIG. 3) or comparison gate 104 (FIG. 4). In general, comparison gate 120 compares each of inputs 122A-122M (inputs 122) to respective inputs 124A-124M (inputs 124). When each of inputs 122 has the same digital logic value as the corresponding one of inputs 124, comparison gate 120 outputs a "1" value at output 130, otherwise comparison gate 120 outputs a "0" value at output 130.

In the example of FIG. 5, comparison gate 120 includes XNOR gates 126A-126M (XNOR gates 126) to compare inputs 122 to respective inputs 124. An XNOR gate outputs a "1" value when the two inputs to the XNOR are the same and a "0" otherwise, according to the truth table of Table 1:

TABLE 1

| P | Q | XNOR (P, Q) |
|---|---|---|
| 0 | 0 | 1 |
| 0 | 1 | 0 |
| 1 | 0 | 0 |
| 1 | 1 | 1 |

The outputs of XNOR gates 126 are combined by AND gate 128. Thus comparison gate 120 outputs a "1" value only when each of the outputs of XNOR gates 126 is a "1." Therefore, comparison gate 120 outputs a "1" value only when each of inputs 122 has the same digital logic value as the corresponding one of inputs 124.

Figure 6:
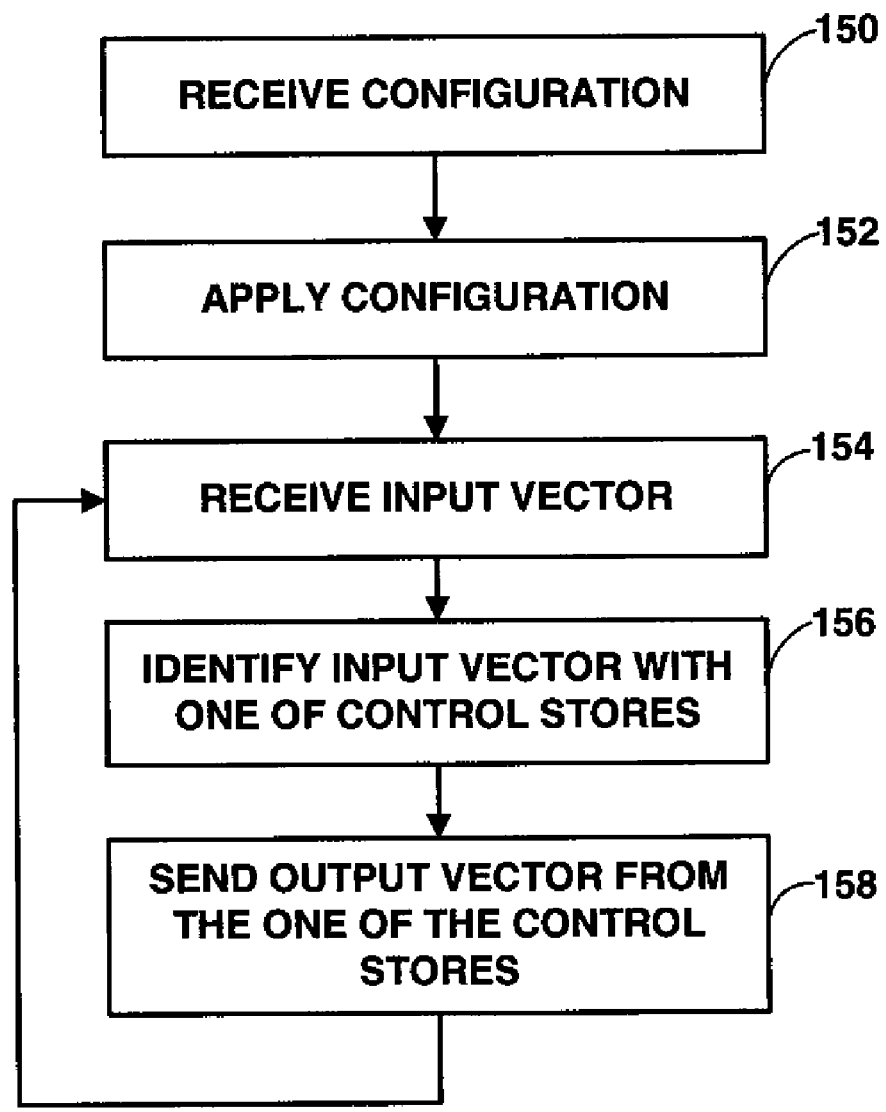
FIG. 6 is a flowchart illustrating an example method for processing a input transaction in the form of an input vector to produce an output transaction in the form of an output vector.

FIG. 6 is a flowchart illustrating an example method for processing an input transaction in the form of an input vector to produce an output transaction in the form of an output vector. Although described with respect to control logic 28 of FIG. 2, other components may perform the method of FIG. 6. For example, in one embodiment, one of processors 10 may include control logic that performs functions similar to those performed by control logic 28.

Initially, interface module 70 receives configuration data for registers of control logic 28 from node controller interface 22 (150). In one embodiment, the configuration data may be written to interface module 70 by node controller interface 22 (FIG. 2) in response to configuration data 13 from one or more of processors 10 or a separate control processor within computing system 2. In any case, node controller interface 22 sends data to interface module 70 to set up various registers of control logic 28 in accordance with the specified configuration. Interface module 70 then outputs electrical signals to program the registers of control logic 28 to set the values of the registers to apply the received configuration (152). Interface module 70 sets the value of entry-enables register 36 to selectively enable and disable particular ones of tied control store entries 38 and spare control store entries 40. Interface module 70 also sets the values of the registers of any enabled spare control store entries 40. Interface module 70, in one embodiment, also sets values of input set register 32, input mask register 34, output set register 42, and output mask register 44 to globally modify input vectors and output vectors. In one embodiment, receiving and applying the configuration occurs during boot-up of a computing device or computer associated with processors 10. In another embodiment, the configuration is stored in the basic input/output system (BIOS) of the computer. In any case, the configuration enables one of spare control store entries 40 to provide an output vector that is distinct from each of the output vectors that are provided by tied control store entries 38. The one of spare control store entries 40 may override one of tied control store entries 38 or may recognize an input vector that none of tied control store entries 38 are able to recognize.

During operation, control logic 28 receives an input transaction in the form of input vector 30 from a component of a source bus, e.g., one of processors 10 (154). In one embodiment, control logic 28 then globally sets and masks bits of input vector 30 to form a modified input vector. Control logic 28 provides the modified input vector to tied control store entries 38, and provides the unmodified input vector 30 directly to spare control store entries 40 (156). Each of tied control store entries 38 and spare control store entries 40 attempts to identify the input vector by applying the input vector to a comparison gate, such as that shown in FIG. 5, and determining whether the input vector matches the comparison vector. In one embodiment, each of tied control store entries 38 masks the modified input vector with a corresponding hard-coded mask vector, and each of spare control store entries 38 masks the input vector with a mask vector in a corresponding mask register.

The one of tied control store entries 38 or spare control store entries 40 that identifies the input vector, and that is enabled by entry-enables register 36, then transmits a corresponding output vector to destination bus 20 (158). When one of tied control store entries 38 identifies the input vector, the output vector is a hard-coded output vector. When one of spare control store entries 40 identifies the input vector, the output vector is a programmable output vector. For example, the one of spare control store entries 40 that has an output vector that is distinct from each of tied control store entries 38 provides the output vector when it identifies the input vector. In one embodiment, one of tied control store entries 38 may also identify the input vector, but be disabled by the configuration that established the value of entry-enables register 36. In one embodiment, none of tied control store entries 38 may identify the input vector and only one of spare control store entries 40 identifies the input vector. After sending the output vector, control logic 28 waits to receive a new input vector (154).

Various embodiments of the invention have been described. These and other embodiments are within the scope of the following claims.

The invention claimed is:

1. A system comprising:
a source bus;
a component connected to the source bus, wherein the component produces a first set of electrical signals;
a node controller, connected to the source bus, comprising control logic that receives the first set of electrical signals from the source bus as an input vector and produces an output vector comprising a second set of electrical signals, wherein the control logic comprises:
an entry-enables register that selectively enables and disables a plurality of control store entries that include:
a plurality of tied control store entries, wherein the tied control store entries each includes hard-coded logic configured to identify unique values of the input vector from the source bus and produces the second set of electrical signals from a hard-coded output vector when the input vector is identified and when the tied control store is enabled; and
a plurality of spare control store entries, wherein the spare control store entries each includes programmable logic configurable to identify values of the input vector and produces the second set of electrical signals from a programmable output vector when the input vector is identified and when the spare control store is enabled,
wherein at least one of the spare control store entries is configured to identify a value of the input vector for which none of the tied control store entries that are enabled by the entry-enables register are configured to identify,
wherein the entry-enables register enables the at least one of the spare control store entries; and
a destination bus that receives the output vector from the node controller, wherein the node controller is connected to the destination bus.

2. The system of claim 1, wherein the entry-enables register enables at least one of the plurality of spare control store entries to override at least one of the plurality of tied control store entries, wherein the entry-enables register disables the at least one of the tied control store entries that is configured to identify values of the input vector that are the same as the values of the input vector identified by the programmable logic of the at least one of the spare control store entries.

3. The system of claim 1, wherein the entry-enables register enables at least one of the plurality of spare control store entries to recognize the input vector, wherein none of the plurality of tied control store entries is able to recognize the input vector.

4. The system of claim 1, wherein the control logic further comprises an input set register and an input mask register that globally set at least one bit of the input vector to a specific digital logic value.

5. The system of claim 1, wherein the control logic further comprises an output set register and an output mask register that globally set at least one bit of the output vector to a specific digital logic value.

6. The system of claim 1, wherein the control logic further comprises an interface module to receive a configuration and applies the configuration to the spare control store entries and to the entry-enables register.

7. The system of claim 1, further comprising a memory connected to the destination bus, wherein the memory receives the output vector from the node controller through the destination bus.

8. The system of claim 1, further comprising an input/output controller connected to the destination bus, wherein the input/output controller receives the output vector from the node controller through the destination bus.

9. The system of claim 1, wherein at least one of the spare control store entries comprises a mask register to store a mask value, a logical AND gate that applies the mask value to the input vector to form a masked input vector, a comparison register to store a comparison vector, a comparison gate that compares the comparison vector to the masked input vector and generates a digital logic value as a result of the comparison, and an output register that stores the output vector.

10. A method comprising:
receiving an input vector comprising a first set of electrical signals from a component of a source bus of a computing device;
identifying values of the input vector with at least one of a plurality of control store entries, wherein the plurality of control store entries includes a first subset comprising tied control store entries that each include hard-coded logic and hard-coded output vectors, and wherein the plurality of control store entries includes a second subset comprising spare control store entries that each include programmable logic and a programmable output vector;
receiving a signal that selectively enables and disables each of the tied control store entries and each of the spare control store entries, wherein the signal enables at least one of the spare control store entries that is configured to identify a value of the input vector for which none of the tied control store entries that are enabled by the signal are configured to identify; and
outputting the programmable output vector of the at least one of the spare control store entries to a destination bus of the computing device.

11. The method of claim 10, further comprising:
receiving a configuration for the at least one of the spare control store entries; and
applying the configuration to the at least one of the spare control store entries to establish the value of the programmable output vector of the at least one of the spare control store entries.

12. The method of claim 11, wherein applying the configuration comprises:
setting a value of a comparison vector in a comparison register of the at least one of the spare control store entries; and
setting a value of the programmable output vector in an output register of the at least one of the spare control store entries,
wherein identifying values of the input vector comprises comparing the value of the comparison vector in the comparison register to the values of the input vector received from the source bus, and
wherein outputting the programmable output vector comprises outputting the value of the output register to the destination bus.

13. The method of claim 10, wherein receiving a signal comprises:
receiving a set of values from the signal for selectively enabling and disabling each of the plurality of control store entries; and storing the set of values in an entry-enables register to selectively enable and disable each of the plurality of control store entries.

14. The method of claim 13, wherein receiving a set of values comprises:
   receiving a first value that enables the at least one of the spare control store entries; and
   receiving a second value that disables one of the tied control store entries, wherein the one of the tied control store entries identifies values of the input vector that are identical to values of the input vector identified by the at least one of the spare control store entries.

15. The method of claim 13, wherein receiving a set of values comprises:
   receiving a first value that enables the at least one of the spare control store entries, wherein the at least one of the spare control store entries identifies an input vector that is not identified by any of the tied control store entries.

16. A device comprising:
   means for receiving an input vector comprising a first set of electrical signals from a component of a source bus of a computing device;
   means for identifying values of the input vector with at least one of a plurality of control store entries, wherein the plurality of control store entries includes a first subset comprising tied control store entries that each include hard-coded logic and hard-coded output vectors, and wherein the plurality of control store entries includes a second subset comprising spare control store entries that each include programmable logic and a programmable output vector;
   means for receiving a signal that selectively enables and disables each of the tied control store entries and each of the spare control store entries, wherein the signal enables at least one of the spare control store entries that is configured to identify a value of the input vector for which none of the tied control store entries that are enabled by the signal are configured to identify; and
   means for outputting the programmable output vector of the at least one of the spare control store entries to a destination bus of the computing device.

17. The device of claim 16, further comprising:
   means for receiving a configuration for the at least one of the spare control store entries; and
   means for applying the configuration to the at least one of the spare control store entries to establish the value of the programmable output vector of the at least one of the spare control store entries.

18. The device of claim 17, wherein the means for receiving a signal comprises:
   means for receiving a set of values from the signal for selectively enabling and disabling each of the set of control store entries; and
   means for storing the set of values in an entry-enables register to selectively enable and disable each of the set of control store entries.

19. The device of claim 18, wherein the means for receiving a set of values comprises:
   means for receiving a first value of the signal that enables the at least one of the spare control store entries; and
   means for receiving a second value that disables one of the tied control store entries, wherein the one of the tied control store entries identifies values of the input vector that are identical to values of the input vector identified by the at least one of the spare control store entries.

20. The device of claim 18, wherein the means for receiving a set of values comprises:
   means for receiving a first value of the signal that enables the at least one of the spare control store entries, wherein the at least one of the spare control store entries identifies an input vector that is not identified by any of the tied control store entries.

* * * * *